UNITED STATES PATENT OFFICE.

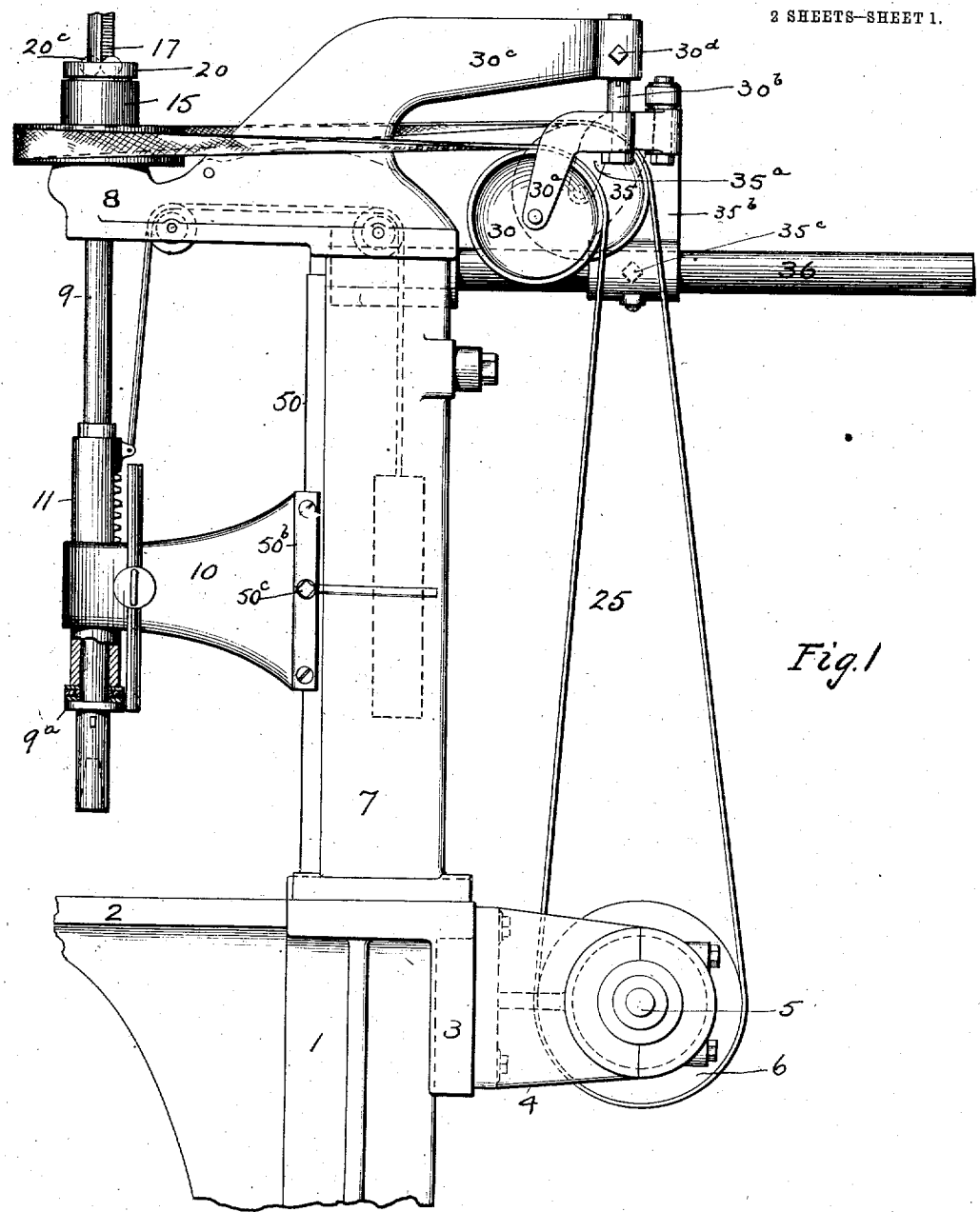

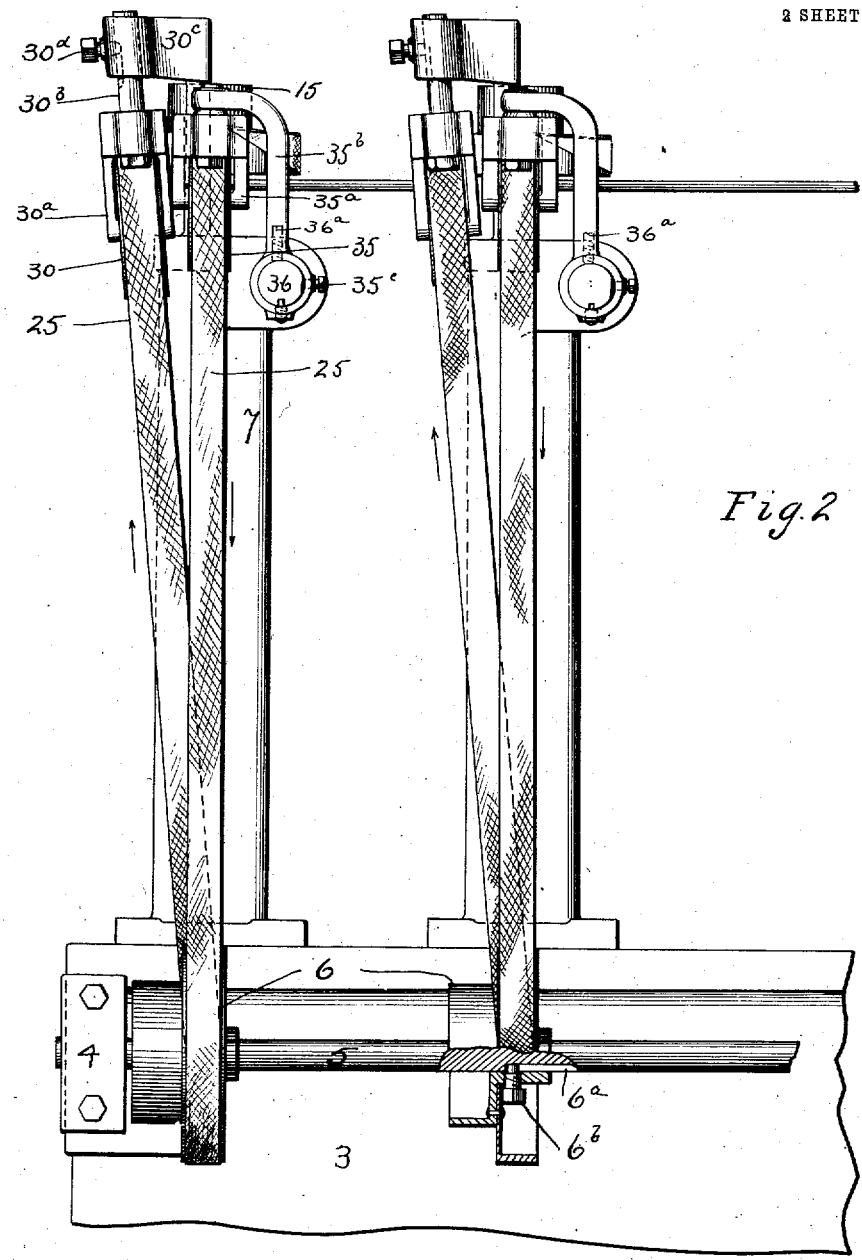

CHARLES DE LOS RICE, OF HARTFORD, CONNECTICUT.

BELT-GEARING.

984,708.

Specification of Letters Patent. Patented Feb. 21, 1911.

Application filed December 17, 1903. Serial No. 185,497. Renewed May 7, 1906. Serial No. 315,496.

*To all whom it may concern:*

Be it known that I, CHARLES DE LOS RICE, citizen of the United States of America, residing at Hartford, in the county of Hartford and State of Connecticut, have invented certain new and useful Improvements in Belt-Gearing, of which the following is a specification.

This invention is shown embodied in a drill press and relates especially to the belt gearing for transmitting the power from the driving to the driven shaft of the machine at any desired one of a number of speed ratios provided for by the belt gearing, but obviously the invention is applicable to other machines wherein the provisions varying the speed ratios of the driven to the driving shaft may be utilized, and is not limited to a drill press.

The invention consists mainly in belt gearing comprising step cone or multiple pulleys on the driving or driven shaft, or, preferably, on both, and intermediate pulleys or idlers and provision for varying and determining the position thereof so that each step or pulley of one shaft may coöperate with any step or pulley on the other shaft, and the belt be properly guided and tightened to transmit the rotary movement from one shaft to the other, the result being that the number of speed ratios provided is equal to the product of the number of pulleys on one shaft multiplied by the number on the other shaft instead of, as in the more common forms of belt gearing, requiring a separate pulley on each shaft for each speed ratio.

The invention also includes a construction and arrangement of the belt gearing whereby a single driving shaft may be employed in conjunction with a plurality of driven shafts, as in a drill press having a number of spindles, each one of which may be driven at the desired speed ratio without reference to the speed at which the others are driven.

Figure 1 is a side elevation of a machine embodying this invention; and Fig. 2 is a rear elevation of the same showing the two spindles of the multiple spindle machine.

The invention is shown as embodied in a drill press having a main support or pedestal 1 provided with a suitable table or work support 2, and having a lip 3 upon which are supported the brackets 4 having the bearings for the countershaft 5 which is the driving shaft of the machine, being itself driven from any suitable source of power. The said driving or countershaft 5 carries the driving pulley 6, which is splined or otherwise connected to said shaft so as to be rotated in unison therewith, and so as to transmit the rotary movement to the driven shaft at any desired one of a number of different speed ratios relative to that of the driving shaft, by the belt gearing which will be hereinafter described.

In the drill press herein shown for illustration, the main supporting base or pedestal 1 has affixed to it one or more uprights 7 each provided with supports 8 and 10 for bearings for each of the driven shafts 9, shown in this case as the usual drill spindles the lower portion of each of which has its rotary bearing in a sleeve 11 which is adapted to be moved longitudinally in the lower bearing support 10 to advance and retract the spindle 9, and the drill or other tool carried from the lower end thereof, relative to the work supported on the table 2 in any suitable or usual manner.

The spindle 9 which is the driven shaft of the machine to which the different speed ratios relative to the speed of the driving shaft 5 are to be imparted according to the requirements of the tool or appliance operated by the said driven shaft, is directly actuated in its rotary movement by the pulley 15 which is shown as a multiple or speed cone pulley shown in this instance as having two steps or pulleys of different size, which, in conjunction with two steps or pulleys of different size on the driving shaft 5, will give four different speed ratios of the driven shaft or spindle 9 relative to that of the driving shaft 5, which is sufficient for the requirements of the machine shown, although obviously a wider range might be provided for by providing one or more additional steps in the driven or driving pulley, or in both, the number of speed ratios, generally speaking, being equal to the product of the number of different sized pulleys on the driving shaft multiplied by the number on the driven shaft, as each driven pulley is adapted to be driven by any desired one of the driving pulleys by the belt gearing connection herein provided.

The connection between the driven pulley 15 and the driven shaft or spindle 9 in the drill press herein shown is such that the former transmits the rotary movement to the latter, while the latter is free to move longitudinally relative to the pulley to present the tool to the work, as required, as before mentioned.

To meet the usual requirements in machines of this character, the driving shaft 5 is horizontal and the spindles or driven shafts 9 are vertical, and the driving shaft 5 in accordance with the present invention is arranged in position lengthwise of the frame of the machine or parallel to the plane through the axes of the driven shafts 9 when the machine comprises a plurality of said driven shafts, one important result of this arrangement being that the single driving shaft 5 may be employed in conjunction with any desired number of driven shafts by being provided with a suitable driving pulley 6 to coöperate with each of the driven shafts.

The power is transmitted from the driving pulley 6 to the driven pulley 15 by means of the endless belt 25, and as the driving and driven pulleys are in different planes, in this case at right angles to one another, the belt in passing from the plane of one pulley to the plane of the other is guided by suitable idlers 30, 35 supported approximately at the intersection of the planes of the driving and driven pulleys. For convenience, that portion of the belt loop which travels from the driving toward the driven pulley, and the idler 30 which guides it from the plane of the one into the plane of the other, will be called the delivery portion of the belt, and the delivery idler, while the portion of the belt which travels from the driven toward the driving pulleys, and the idler 35 by which it is guided from the plane of the one to the plane of the other will be called the return portion of the belt and the return idler.

In order that a belt may remain on the pulley with which it coöperates, the portion traveling toward the pulley should approach it in the plane of rotation thereof, and inasmuch as the steps of the driven pulley 15 are in different parallel planes, provision is made for supporting the delivery idler 30 at different levels to correspond to the step of the driven pulley which is at any time in use. In the construction herein shown, the said delivery idler 30 is mounted on or has its bearings in a yoke 30$^a$ which is pivotally supported on a stud 30$^b$ which is itself vertically adjustable in the overhanging arm or bracket 30$^c$ forming a portion of the main frame, and provision is made, in this instance by the set screw 30$^d$ for securing the stud 30$^b$ at different positions in the arm 30$^e$, so that the delivery idler 30 may be set at and retained in the proper level to cause the belt running tangentially from its periphery to track properly with whichever one of the steps of the driven pulley is to be used in order to obtain the speed desired for the spindle and tool carried thereby. With the same rotary speed of the driving shaft and the same driving pulley in use, the speed of the spindle will be greater when the belt is running on a smaller driven pulley, as, for example, the upper step of the driven pulley shown, than when running upon a larger driven pulley. It is of less importance that the portion of the belt running off from a pulley should be guided exactly in the plane of the pulley, and, consequently, it is unnecessary to provide vertical adjustment of the return idler 35 where only two steps are employed in the driven pulley 15, as return idler 35, if located as shown with its periphery about tangential to the dividing plane between the two steps of the driven pulley 15, will serve properly to guide the belt running from either step without danger of the belt running off if the delivery idler 30 is properly set, as already explained.

As the plane of the driving pulley 6 is coincident with the axis of the driven shaft or spindle 9, or approximately so, a movement of the idlers 30, 35, or either of them, toward or from the driven pulley in the plane of the latter, or in a plane parallel thereto, will take place in the direction of the plane of the driving pulley, and, consequently, such movement of the idlers, or of either of them, may be availed of to take up any slack in the belt, and to keep it at the proper tightness or tension for effective operation, and such provision for taking up the slack of the driving belt is made in the construction shown by mounting the return idler 35 in a yoke 35$^a$, itself supported on a carrier 35$^b$ adapted to be moved along and secured at any desired position on a guide 36 connected with or forming part of the main frame of the machine, the said guide being shown as a rod, and the portion of the carrier traveling thereon being splined or keyed so as not to turn thereon, and being made fast by a set screw 35$^c$ when set at the position for properly tightening the belt.

The return idler 35 is located and movable in a plane approximately coincident with the plane of the driving pulley 6 on the driving shaft 5, and where, as in the present case, the said driving pulley is a multiple pulley or comprises steps of different size, provision is made for moving the pulley or step which is at any time required for operation along the shaft 5, to the proper position to track with or receive the belt running from the driven pulley and return idler 35 toward the said driving pulley.

In the construction herein shown, the driving pulley 6 has two steps, and is arranged to slide along the countershaft 5 within fixed limits, the said countershaft being provided with a groove, as shown at 6$^a$, and the pulley hub having a set screw 6$^b$ extending into said groove, and thereby serving to limit the sliding movement of the pulley along the shaft, and to secure the pulley at the proper position in said sliding movement.

As shown in Fig. 2 each of the belts of the two drilling heads therein shown is running upon the corresponding larger driving pulley, and thus giving the maximum speed to the belt; but if it is desired to run the belt at a lower speed so as to obtain a lower range of speeds for the driven spindle, the pulley is slid along the shaft to move the larger pulley from the driving plane, and this same movement in this case brings the smaller pulley into the driving plane, so that the belt may now be driven at the slower speed, and may impart the desired speed of the lower range to the driven pulley according as a larger or smaller step of the driven pulley is put into use by setting the delivery idler 30 at the proper level and setting the return idler 35 at the proper position to tighten the belt with reference to the driving and driven pulleys at any time in use. The different pulleys on the driving shaft thus run in the same plane when at work.

Referring to Fig. 2, it will be seen that the delivery idler 30 is a little to one side of the plane of the driving pulley 6, and said delivery idler is, therefore, supported in a slightly inclined position, so that its plane intersects that of the driving pulley approximately at the level of the latter, and the belt, therefore, runs from the driving pulley square to the said delivery idler.

It will be seen that the yokes 30ª, 35ª, in which the idlers have their bearings have a swivel connection with their supports 30ᵇ and 35ᵇ on an axis approximately tangential to the point at which the loop of the belt passing around the driving pulleys meets them, and the tension of the belt thus tends to swivel the pulleys to the position in which their planes are approximately tangential to the periphery of the driven pulley, which is at any time in operation, so that the belt runs squarely to all of the pulleys over which it passes under all conditions of use. By the particular arrangement and combination of these parts and by using two-step pulleys both on the drill spindle and on the countershaft, I obtain four changes of speed and a corresponding increase in the range of utility of the machine. It will be noted that the idler journals are below the point at which their supporting yokes are pivoted giving a caster effect to the idlers which makes them extremely sensitive and quick to alter their positions and accommodate themselves to any condition which can be imposed upon them, and also insures their self alinement although the axis of the countershaft does not intersect the axes of the drill spindles.

To illustrate the speed adjustment of the machine let it be supposed that the belt is running on the larger step of each pulley, as shown in Figs. 1 and 2, and the speed is to be changed by running the belt on the small steps of the two pulleys. The belt is first shifted from the larger to the small steps, the set screw 30ᵈ is released and the stud 30ᵇ is raised in the arm 30ᶜ carrying the delivery idler 30 up so that its upper face will properly deliver the belt to the small step of the pulley 15. The pulley 6 is slid along the countershaft to remove the larger step from the driving plane and the small step is thus brought into the proper condition to insure the proper tracking of the belt. The set-screw 35ᶜ is released and the carrier 35ᵇ drawn out on the rod 36 sufficiently to take up the slack in the belt and there locked in place by the set-screw 35ᶜ.

In the drawings the pulleys on the spindle and countershaft are shown as having two steps. It is clear that by using a pair of pulleys of different diameters on either the spindle or the counter shaft the same results can be accomplished as by using the two-step pulleys illustrated, the constructions being equivalent except for the matters involved in manufacture or assembling.

I have illustrated my invention in its adaptation to drill presses merely for convenience but do not wish to be understood that it is capable of application only to such a machine.

In the concrete apparatus herein shown as an embodiment of the invention, the horizontal shaft is the driving shaft, and the vertical shaft the driven shaft, but, obviously, the transmitting gearing might equally well be employed with either shaft working as the driving shaft and the other as the driven shaft, it being a characteristic of the belt gearing that the idlers run approximately in the plane of rotation of the pulley upon one of the shafts, and their movement of adjustment is in or parallel with said plane, so that the adjustment necessary to provide for the proper tracking of the belt with any of the pulleys of the other shaft and for the proper tightening of the belt may be effected without disturbing the tracking of the belt with the pulley in or parallel with the plane of which the movement of adjustment of the idlers takes place.

In the construction specifically shown, the delivery idler 30 should run with its periphery tangential to the plane of rotation of the pulley, or pulley step, 15, on the driven shaft 9 at any time in use, while the return pulley 35 should run in the plane of the driving pulley or step of the driving pulley 6 at any time in use, and obviously these conditions might be fulfilled either by moving the idlers in the proper relation to the respective driving and driven pulleys, as is the case with the delivery idler 30 relative to the driven pulley 15, or by moving the driving or driven pulley relative to the idler with which it is to track, as is the case with the driving pulley 6 in the construction herein specifically shown.

It is important that each idler should be properly located with reference to the pulley toward which the belt runs in passing over said idler, that is, the idler 30 with its periphery tangential to the central or driving plane of the pulley 15 at any time in use, and the idler 35 with its periphery at the point where the belt leaves it in the plane of the driving pulley 6, at any time in use, while it is not necessary that the delivery pulley 30 should be exactly in the plane of the driving pulley 6, nor that the return pulley 35 should have its periphery exactly tangential to the plane of the driven pulley 15 at any time in use. These conditions are fully provided for in the construction shown in which the delivery pulley 30 is adjustable in a vertical direction to the proper relation to the driven pulley at any time in use, while the return idler 35 is adjustable in the horizontal direction in the plane of the driving pulley 6, and it is evident that any other or additional movements of said idlers or of either of them which did not interfere with these conditions would be of no practical consequence so far as the essential character and mode of operation of the belt gearing are concerned. It is also evident that in its details of arrangement the invention is capable of wide variations, some of which form the basis of other applications.

I claim:—

1. A belt gearing for drill presses and analogous devices comprising a horizontal driving shaft and a vertical driven shaft or spindle, a plurality of pulleys of different diameter having different parallel planes of rotation on said spindle, and a plurality of pulleys on said driving shaft adapted to run in the same plane of rotation when at work; a belt; and delivery and return idlers running in planes approximately parallel to that of the pulleys on the driving shaft; said delivery idler being adjustable in the direction transverse to the plane of rotation of the pulleys on the driven shaft to cause the belt to track properly with any desired one of said pulleys, an idler being adjustable in the direction of the planes of rotation of the pulleys on the driving shaft to properly tighten the belt.

2. A belt gearing for drill presses and analogous devices comprising a horizontal driving shaft and a vertical driven shaft or spindle; a plurality of pulleys of different diameters on said spindle; and a plurality of pulleys on said driving shaft; a belt; and delivery and return idlers running in planes approximately parallel to those of the pulleys on the driving shaft; the relative position of the delivery idler and the pulleys on the driven shaft being adjustable in the direction transverse to the planes of rotation of the latter to cause the belt to track properly with any desired one of said pulleys; the relative position between the return idler and the pulleys on the driving shaft being adjustable in the direction transverse to the plane of rotation of the latter to cause the belt to track properly with any desired one of said pulleys.

3. A belt gearing for use on drill presses and similar machines comprising a driving shaft and a driven shaft arranged at an angle to one another, pulleys of different diameters on said driving shaft and also on said driven shaft, and means including adjustably mounted idlers whereby each pulley on said driving shaft will coöperate with each pulley on said driven shaft.

4. A belt gearing for drill presses and analogous devices comprising a supporting frame, a horizontal driving shaft extending lengthwise of the supporting frame and a vertical driven shaft, a plurality of pulleys of different diameter on said driving shaft and also on said driven shaft, a belt, and devices to cause each pulley on said driving shaft to coöperate with each pulley on said driven shaft, said devices including a vertically adjustable idler for the delivery side of said belt and an idler for the return side of said belt, the relative position of said return idler and said driving shaft pulleys being adjustable in the direction transverse to the plane of rotation of the latter.

5. A belt gearing for use on drill presses and similar machines comprising a horizontal driving shaft and a vertical driven shaft, said driven shaft being parallel to a vertical plane passing through the axis of said driving shaft, a pair of pulleys of different diameters on each shaft, a belt, independently adjustable idlers adapted to take the delivery and return sides of said belt, said delivery idler being adjustable vertically, the relative positions of said delivery idler and the pulleys on the driven shaft and also of said return idler and the pulleys on said driving shaft being adjustable whereby each pulley of one pair will coöperate with each pulley of the other pair.

6. A belt gearing for use on drill presses and similar machines comprising a driving shaft and a driven shaft arranged at an angle to one another, step cone pulleys thereon one of which is adjustable lengthwise on its shaft, and means for causing each step of said driving shaft pulley to coöperate with each step of said spindle pulley, comprising a belt and adjustably mounted idlers for the delivery and return sides of said belt.

7. A belt gearing for use on drill presses and similar machines comprising a supporting frame, a horizontal driving shaft extending lengthwise of the supporting frame of the machine and a vertical driven shaft arranged at an angle to said driving shaft, a pulley on said driven shaft, pulleys of different diameters on said driving shaft, a belt, separate idlers for the delivery and return sides of said belt, the relative position of said return idler and said driving shaft pulleys being adjustable whereby either one of the driving shaft pulleys will be caused to track with the return idler.

8. A belt gearing for use on drill presses and similar machines comprising a supporting frame, a counter shaft extending lengthwise of the supporting frame and a spindle arranged at an angle thereto, pulleys on said shaft and spindle, the counter shaft pulley having a plurality of steps, a belt, separate idlers for the delivery and return sides of said belt, the relative position of said return idler and the steps of said counter shaft pulley being adjustable in a direction transverse to the planes of rotation of said counter shaft pulley.

9. A belt driving mechanism for use on drill presses and similar machines comprising shafts arranged at an angle to one another, step-cone-pulleys on each shaft, and an endless belt passing around said pulleys, in combination with idler pulleys for the delivery and return sides of said belt, said idlers being movable independently of one another, the delivery idler being adjustable vertically and the return idler being adjustable horizontally, the relative position of the return idler and the steps of the pulley on said counter shaft being adjustable in the direction transverse to the planes of rotation of the latter whereby either step of the counter shaft pulley may track with the return idler.

10. A belt driving mechanism for use on drill presses and similar machines comprising a supporting frame driving a horizontal and a vertical driven shaft, said driving shaft extending lengthwise of the supporting frame of the machine, step cone pulleys on each shaft, and a belt, in combination with idler pulleys for the delivery and return sides of said belt, the former being adjustable vertically and the latter horizontally, the step-cone pulley on said driving shaft being adjustable lengthwise thereof to bring either step into tracking relation with said return idler.

11. A belt driving mechanism adapted for use on drill presses and like machines comprising a horizontal and a vertical shaft arranged at an angle to one another, step cone pulleys on each shaft, a belt, means for guiding the delivery side of said belt to either step of the driven pulley, and an idler for the return side of said belt adjustably mounted for movement in the plane of the driving pulley.

12. A belt driving mechanism for use on drill presses and like machines comprising the spindle and counter shaft arranged at an angle to one another, step-cone-pulleys mounted on each shaft, and a belt, in combination with means for guiding the delivery side of said belt to either step of the spindle pulley, an idler for the return side of said belt, the relative position of the return idler and the steps of the counter shaft pulley being adjustable in the direction transverse of the planes of rotation of the latter whereby said return idler is caused to track with either step of said counter shaft pulley.

13. A driving mechanism comprising the combination of a horizontal driving and vertical driven shaft; pulleys thereon; an endless belt passing around said pulleys; a stationary stud-guide, the bore of which is at a fixed acute angle to the vertical; a stud which fits in said bore and is guided thereby and adjustable therein; a delivery idler mounted on said stud with its axis squared in all positions to the delivery line of said belt; and an idler for the return side of the belt.

14. A driving mechanism comprising the combination of coöperating shafts set at an angle to each other, pulleys thereon, an endless belt passing around said pulleys, a stud adapted to be guided in its adjustment at a fixed acute angle to the vertical, a delivery idler carried by said stud with its axis squared in all positions to the delivery line of said belt, said delivery idler being free at all times to swing and thereby adjust itself automatically, and an idler for the return side of said belt.

15. A driving mechanism comprising coöperating shafts set at an angle to each other, pulleys mounted thereon, an endless belt passing around said pulleys, a stud adjustable up and down, an idler for the delivery side of said belt, said idler being mounted free to swing at all times upon its stud and adjust itself automatically thereon, a carrier, a second idler for the return side of said belt mounted free to swing at all times upon its carrier, said carrier being adjustable back and forth.

16. A driving mechanism comprising coöperating shafts one horizontal and the other vertical, pulleys mounted thereon; a belt and idlers therefor, one of said idlers being pivoted normally to swing free at all times in a substantially horizontal plane and adapted for vertical adjustment, the other idler being pivoted normally to swing freely at all times in a substantially horizontal plane and adapted for adjustment back and forth horizontally, substantially as described.

17. A driving mechanism comprising coöperating shafts set at an angle to each other, a pulley mounted on one of said shafts, a step-pulley mounted on and slidable along the other of said shafts, an endless belt passing around said pulleys, an idler for the delivery side of said belt, a stud on which said idler is mounted free to swing at all times and adjust itself automatically thereon, a second idler for the return side of said belt, a carrier on which said idler is mounted free to swing at all times and adjust itself automatically, said carrier being adjustable back and forth horizontally.

18. A driving mechanism comprising coöperating shafts; a pulley mounted on one of said shafts; a step-pulley mounted on and adjustable along the other of said shafts; a pair of idlers interposed between said pulleys, one of said idlers being mounted free to swing at all times and adjustable back and forth horizontally to provide for the slack of the belt due to change of speed; and an endless belt passing around said pulleys and over said idlers.

19. A driving mechanism comprising shafts set at an angle to each other, pulleys thereon; a stud guide having a bore that is slightly inclined to vertical, a stud which fits and is adjustable in said bore of the guide; an idler pulley mounted on the stud that is adjustable in the bore of the guide, another idler pulley and an endless belt passing around the shaft pulleys and about the idler pulleys.

20. A driving mechanism comprising shafts set at an angle to each other, pulleys thereon; a stud adjustable acutely to vertical, an idler pulley mounted upon and movable with its stud in such a manner that its axis is squared in all positions to the belt, said idler also being free to swing and automatically adjust itself, another idler pulley, and an endless belt passing around the shaft pulleys and about the idler pulleys.

21. A driving mechanism comprising shafts set at an angle to each other, pulleys mounted thereon; two idler pulleys arranged between the shaft pulleys, an endless belt passing around the shaft pulleys and about the idler pulleys, one idler being mounted so that it can be adjusted up and down and can swing freely and automatically arrange itself horizontally at all times, and the other idler being mounted so that it can be adjusted back and forth and can swing freely and automatically arrange itself horizontally at all times.

22. A driving mechanism comprising shafts arranged at an angle to one another, pulleys mounted thereon; a belt and idlers therefor, one of said idlers being pivoted so as to swing freely at all times in a substantially horizontal plane and to be capable of horizontal adjustment.

23. In a drill press a supporting frame comprising the pedestal and upright, an overhanging arm at the front of the upright, a spindle supported thereon, a counter shaft supported in suitable bearings at the rear of the upright and extending lengthwise of the supporting frame of the machine, pulleys of different diameters on said spindle and also on said counter shaft, adjustably mounted idler pulleys supported on separate axes and adapted to take the delivery and return sides of the belt, the relative position of the return idler and the pulleys on said counter shaft being adjustable in the direction transverse to the planes of rotation of the latter whereby said return idler is caused to track with either of the counter shaft pulleys.

24. In a drill press the pedestal and upright, an overhanging arm at the front of the upright, a spindle supported therein, a counter shaft arranged at right angles to the spindle, pairs of pulleys of different diameters on the counter shaft and the spindle, and adjustably mounted idlers for the delivery and return sides of said belt, said counter shaft pulleys being adjustable along said shaft to bring either one into tracking relation with the return idler.

25. In a multiple spindle drill press a supporting frame, a plurality of vertical spindles, a horizontal driving shaft extending lengthwise of the supporting frame and common to all of said spindles, and driving connections between each spindle and the driving shaft, said driving connections comprising pulleys of different diameters on said shaft, a pulley on the spindle, an endless belt, and means whereby each of the pulleys on said shaft will coöperate with the pulley on the spindle, said means including idlers for the delivery and return sides of said belt, the relative position of said return idler and the pulleys on the driving shaft being adjustable in the direction transverse to the planes of rotation of the latter.

26. In a multiple spindle drill press a supporting frame, a plurality of vertical spindles, a horizontal driving shaft extending lengthwise of the supporting frame and common to all of said spindles, and driving connections between each spindle and the driving shaft, said driving connections comprising pairs of pulleys of different diameters on said shaft and on said spindle, and means whereby each of the pulleys on said shaft will coöperate with each of the pulleys on the spindle, said means including adjustably mounted idler pulleys for the delivery and return sides of said belt, the relative position between said return idler and the pulleys on the driving shaft being adjustable in the direction transverse to the planes of rotation of the latter.

27. A belt gearing for drill presses and analogous devices comprising a supporting frame, a driving shaft extending lengthwise thereof, a driven shaft parallel to a vertical plane passing through the axis of said driving shaft, a pulley on one of said shafts, a plurality of pulleys of different diameter on the other shaft, a flat belt, separate idlers for the delivery and return sides of said belt, one of said idlers being adjustable independently of the other, the relative position of said plurality of pulleys and the idler delivering the belt thereto being adjustable in the direction transverse to the plane of rotation of the former, whereby the belt may be caused to track with either one of said plurality of pulleys.

28. A belt gearing for drill presses and analogous devices comprising a supporting frame, a driving shaft extending lengthwise thereof, a driven shaft parallel to a vertical plane passing through the axis of said driving shaft, a pulley on one of said shafts, a plurality of pulleys of different diameter on the other shaft, a flat belt, separate idlers for the delivery and return sides of said belt, said plurality of pulleys being adjustable along their shaft, the relative position of said plurality of pulleys and the idler delivering the belt thereto being adjustable in the direction transverse to the plane of rotation of the former, whereby the belt may be caused to track with either one of said plurality of pulleys.

29. A belt gearing for drill presses and analogous devices comprising a supporting frame, a driving shaft extending lengthwise thereof, a driven shaft parallel to a vertical plane passing through the axis of said driving shaft, a pulley on one of said shafts, a plurality of pulleys of different diameter on the other shaft, a flat belt, separate idlers for the delivery and return sides of said belt, one of said idlers being adjustable independently of the other, and said plurality of pulleys being adjustable along their shaft, the relative position of said plurality of pulleys and the idler delivering the belt thereto being adjustable in the direction transverse to the plane of rotation of the former, whereby the belt may be caused to track with either one of said plurality of pulleys.

In testimony whereof I affix my signature in presence of two witnesses.

CHARLES DE LOS RICE.

Witnesses:
H. E. HART,
DANIEL M. WRIGHT.

---

Corrections in Letters Patent No. 984,708.

It is hereby certified that in Letters Patent No. 984,708, granted February 21, 1911, upon the application of Charles De Los Rice, of Hartford, Connecticut, for an improvement in "Belt-Gearing," errors appear in the printed specification, requiring correction as follows: Page 5, line 44, the word "driving" should be stricken out and a comma inserted instead, and same page, line 45, after the word "horizontal" the word *driving* should be inserted; and that the said Letters Patent should be read with these corrections therein that the same may conform to the record of the case in the Patent Office.

Signed and sealed this 4th day of April, A. D., 1911.

[SEAL.]

C. C. BILLINGS,
*Acting Commissioner of Patents.* ing shaft, a pulley on one of said shafts, a plurality of pulleys of different diameter on the other shaft, a flat belt, separate idlers for the delivery and return sides of said belt, one of said idlers being adjustable independently of the other, the relative position of said plurality of pulleys and the idler delivering the belt thereto being adjustable in the direction transverse to the plane of rotation of the former, whereby the belt may be caused to track with either one of said plurality of pulleys.

28. A belt gearing for drill presses and analogous devices comprising a supporting frame, a driving shaft extending lengthwise thereof, a driven shaft parallel to a vertical plane passing through the axis of said driving shaft, a pulley on one of said shafts, a plurality of pulleys of different diameter on the other shaft, a flat belt, separate idlers for the delivery and return sides of said belt, said plurality of pulleys being adjustable along their shaft, the relative position of said plurality of pulleys and the idler delivering the belt thereto being adjustable in the direction transverse to the plane of rotation of the former, whereby the belt may be caused to track with either one of said plurality of pulleys.

29. A belt gearing for drill presses and analogous devices comprising a supporting frame, a driving shaft extending lengthwise thereof, a driven shaft parallel to a vertical plane passing through the axis of said driving shaft, a pulley on one of said shafts, a plurality of pulleys of different diameter on the other shaft, a flat belt, separate idlers for the delivery and return sides of said belt, one of said idlers being adjustable independently of the other, and said plurality of pulleys being adjustable along their shaft, the relative position of said plurality of pulleys and the idler delivering the belt thereto being adjustable in the direction transverse to the plane of rotation of the former, whereby the belt may be caused to track with either one of said plurality of pulleys.

In testimony whereof I affix my signature in presence of two witnesses.

CHARLES DE LOS RICE.

Witnesses:
H. E. HART,
DANIEL M. WRIGHT.

---

Corrections in Letters Patent No. 984,708.

It is hereby certified that in Letters Patent No. 984,708, granted February 21, 1911, upon the application of Charles De Los Rice, of Hartford, Connecticut, for an improvement in "Belt-Gearing," errors appear in the printed specification, requiring correction as follows: Page 5, line 44, the word "driving" should be stricken out and a comma inserted instead, and same page, line 45, after the word "horizontal" the word *driving* should be inserted; and that the said Letters Patent should be read with these corrections therein that the same may conform to the record of the case in the Patent Office.

Signed and sealed this 4th day of April, A. D., 1911.

[SEAL.]

C. C. BILLINGS,
*Acting Commissioner of Patents.*

It is hereby certified that in Letters Patent No. 984,708, granted February 21, 1911, upon the application of Charles De Los Rice, of Hartford, Connecticut, for an improvement in "Belt-Gearing," errors appear in the printed specification, requiring correction as follows: Page 5, line 44, the word "driving" should be stricken out and a comma inserted instead, and same page, line 45, after the word "horizontal" the word *driving* should be inserted; and that the said Letters Patent should be read with these corrections therein that the same may conform to the record of the case in the Patent Office.

Signed and sealed this 4th day of April, A. D., 1911.

[SEAL.]

C. C. BILLINGS,
*Acting Commissioner of Patents.*